United States Patent
Rao et al.

(10) Patent No.: US 10,315,771 B1
(45) Date of Patent: Jun. 11, 2019

(54) SHAPE MEMORY ALLOY LUMBAR SUPPORT SYSTEM

(71) Applicant: AMI Industries, Inc., Colorado Springs, CO (US)

(72) Inventors: Sreekanth Koti Ananda Rao, Karnataka (IN); Mahesh Virupaxi Hosmani, Karnataka (IN); Satya Swaroop Panda, Karnataka (IN); Pradeep Acharya, Bangalore (IN)

(73) Assignee: AMI INDUSTRIES, INC., Colorado Springs, CO (US)

(*) Notice: Subject to any disclaimer, the term of this patent is extended or adjusted under 35 U.S.C. 154(b) by 0 days.

(21) Appl. No.: 15/900,796

(22) Filed: Feb. 20, 2018

(30) Foreign Application Priority Data

Dec. 8, 2017 (IN) .............................. 201711044187

(51) Int. Cl.
*B60N 2/66* (2006.01)
*A47C 7/46* (2006.01)
*B64D 11/06* (2006.01)

(52) U.S. Cl.
CPC ............ *B64D 11/0639* (2014.12); *A47C 7/46* (2013.01)

(58) Field of Classification Search
CPC .............................. B64D 11/0639; A47C 7/46
USPC ............................................ 297/284.1, 284.4
See application file for complete search history.

(56) References Cited

U.S. PATENT DOCUMENTS

| | | | |
|---|---|---|---|
| 7,303,231 B2 | 12/2007 | Frank | |
| 7,448,678 B2* | 11/2008 | Browne | A47C 7/38 |
| | | | 297/216.12 |
| 7,758,121 B2* | 7/2010 | Browne | B60R 7/043 |
| | | | 297/284.11 |
| 7,775,596 B2* | 8/2010 | Kennedy | B60N 2/20 |
| | | | 297/361.1 |
| 7,905,547 B2* | 3/2011 | Lawall | B60N 2/0224 |
| | | | 297/284.4 X |

(Continued)

FOREIGN PATENT DOCUMENTS

| | | |
|---|---|---|
| DE | 102006034612 A1 | 1/2008 |
| JP | 2009110217 A | 5/2009 |
| WO | 2016153917 A1 | 9/2016 |

OTHER PUBLICATIONS

European Search Report for Application No. 18211005.6-1010, dated Mar. 4, 2019, 7 pages.

*Primary Examiner* — Rodney B White
(74) *Attorney, Agent, or Firm* — Cantor Colburn LLP

(57) ABSTRACT

A lumbar support system for an aircraft seat includes a deformable lumbar support basket having a proximate end and a distal end. The system includes a shape memory alloy tension cable in communication with the proximate end of the deformable lumbar support basket, and the distal end of the deformable lumbar support basket. The shape memory alloy tension cable has a changeable tension length with an electric current through the cable. The system also includes a controller operatively connected with the shape memory alloy tension cable. The controller transmits the electric current through the shape memory alloy tension cable based on the user actuation. The electric current causes the shape memory alloy tension cable to deform the lumbar support basket by tension force applied to the proximate end of the deformable lumbar support basket and the distal end of the deformable lumbar support basket.

12 Claims, 4 Drawing Sheets

(56) References Cited

U.S. PATENT DOCUMENTS

| | | | |
|---|---|---|---|
| 7,909,403 B2* | 3/2011 | Lawall | B60N 2/4235 |
| | | | 297/284.9 |
| 8,038,215 B2 | 10/2011 | Di Giusto et al. | |
| 8,100,471 B2* | 1/2012 | Lawall | B60N 2/4279 |
| | | | 297/216.1 |
| 8,109,567 B2* | 2/2012 | Alexander | B60N 2/888 |
| | | | 297/216.12 |
| 8,998,320 B2* | 4/2015 | Mankame | B60N 2/002 |
| | | | 297/284.11 |
| 9,346,385 B2* | 5/2016 | Sachs | A61H 9/0078 |
| 2007/0188004 A1 | 8/2007 | Browne et al. | |
| 2009/0224584 A1* | 9/2009 | Lawall | B60N 2/002 |
| | | | 297/311 |
| 2017/0275001 A1* | 9/2017 | Luevano Gonzalez | B64D 11/0639 |

* cited by examiner

SHAPE MEMORY ALLOY LUMBAR SUPPORT SYSTEM

FOREIGN PRIORITY

This application claims priority to Indian Patent Application No. 201711044187 filed Aug. 12, 2017, the entire contents of which is incorporated herein by reference.

BACKGROUND

Exemplary embodiments pertain to the art of aircraft seating and more specifically to a shape memory alloy lumbar support system for an aircraft seat.

Aircraft seats are designed to support the posture of a user by supporting, among other things, the lumbar region of the lower back. Current systems for lumbar support in aircraft seating often have multiple parts including rack and pinion mechanisms to achieve buckling of the lumbar basket there by resulting in different profiles of the lumbar support. Conventional lumbar supports can include actuation knobs or levers, cable to translate tension or compression from the actuation mechanism to the lumbar basket, and other parts in support of these components. All these components contribute to the increased weight of the seat. Components that are lightweight as required in an aircraft can be costly to manufacture and maintain over the life of the aircraft. Moreover, manually-actuated lumbar support systems do not include controls that automatically adjust to user preferences with the push of a button.

BRIEF DESCRIPTION

Disclosed is a lumbar support system for an aircraft seat. The lumbar support system includes a deformable lumbar support basket having a proximate end and a distal end. The system includes a shape memory alloy tension cable in communication with the proximate end of the deformable lumbar support basket, and in communication with the distal end of the deformable lumbar support basket. The shape memory alloy tension cable has a changeable tension length when an electric current is transmitted through the cable. The system includes a controller operatively connected with the shape memory alloy tension cable. The controller transmits the electric current through the shape memory alloy tension cable. The electric current causes the shape memory alloy tension cable to deform the lumbar support basket by tension force applied to the proximate end of the deformable lumbar support basket and the distal end of the deformable lumbar support basket.

A controller for a lumbar support system is also disclosed. The controller includes a non-transitory computer-readable memory storing program instructions that, when executed by a processor, cause the processor to receive an actuation signal, and determine, via the actuation signal, a user profile indicative of a magnitude of electric current to deform a deformable lumbar support basket. The processor transmits, based on the user profile, an electric current through a shape memory alloy tension cable that has a changeable tension length with the electric current through the cable. The shape memory alloy tension cable is in communication with a proximate end of the deformable lumbar support basket, and in communication with a distal end of the deformable lumbar support basket, where the electric current transmitted through the shape memory alloy causes the shape memory alloy tension cable to deform the lumbar support basket by tension force applied by the shape memory alloy tension cable to the proximate end of the deformable lumbar support basket and the distal end of the deformable lumbar support basket.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Figure 1:
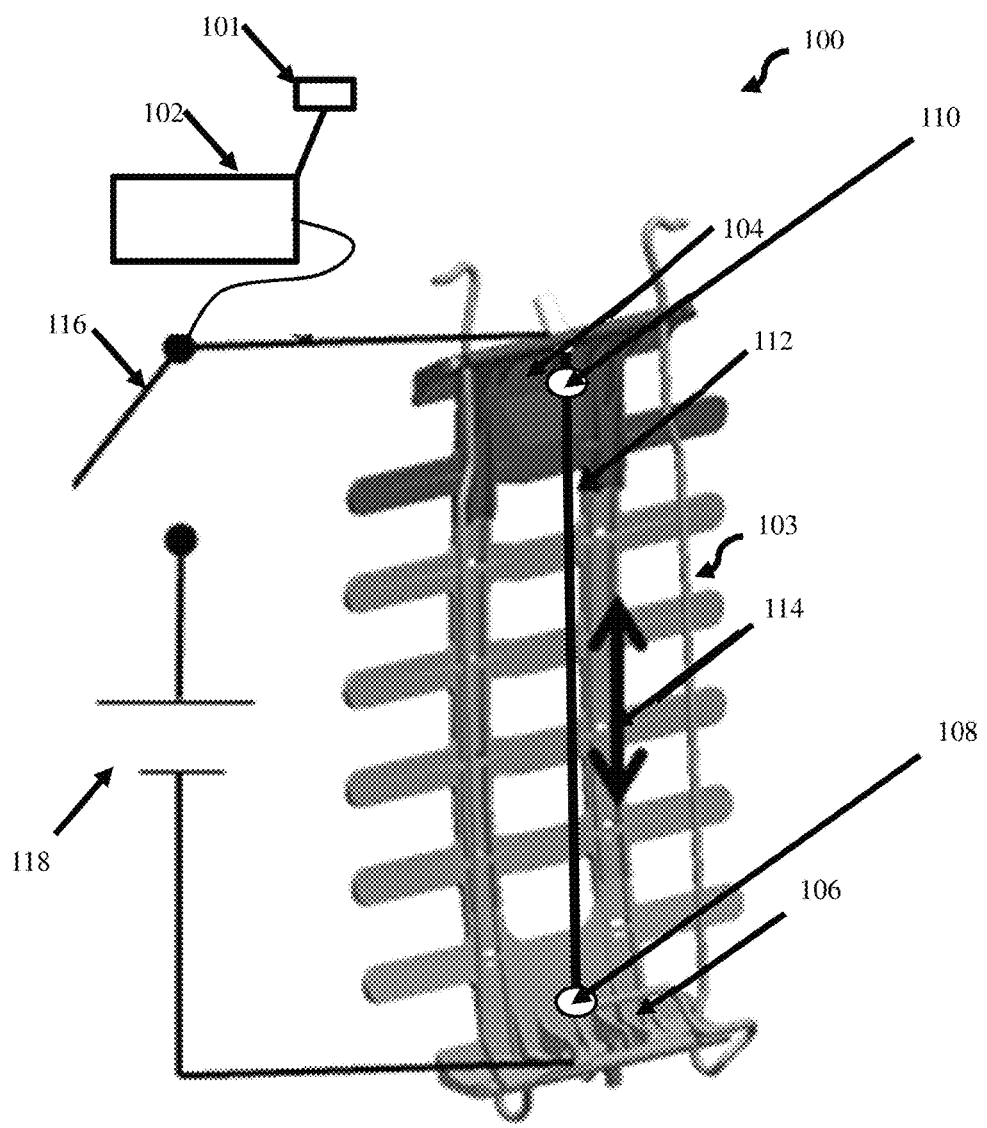
FIG. 1 is a shape memory lumbar support system according to embodiments.

FIG. 1 depicts a shape memory lumbar support system 100 according, to an embodiment. The lumbar support system 100 includes a controller 102 operatively connected with a switch 116 for switching a power source 118. The system includes a deformable lumbar support basket 103 (hereafter support basket 103), and a shape memory alloy tension cable 112 (hereafter tension cable 112) in communication with the support basket 103. The support basket 103 is described herein as having a proximate end 104 and a distal end 106. The tension cable 112 is in mechanical communication with proximate end 104 and a distal end 106 such that when a current passes through the tension cable 112, the tension cable 112 contracts proportionally with the magnitude of current applied through the tension cable. The tension applied to the proximal end 104 and the distal end 106 of the support basket 103 by the tension cable 112 causes the support basket 103 to deform longitudinally 114 by forcing the distal end and proximal end to come towards one another. This deformation of the support basket 103 causes the basket to bow and form an arc that supports the lumbar portion of a user's back.

The tension mechanism of the tension cable 112 is based on a property of the shape memory alloy from which the cable 112 is constructed. Shape memory alloy contracts when an electric current, heat, or other stimulus (depending on the material) is applied to the cable. The connecting ends 110 and 108 of the tension cable 112 include connecting means such that the current from the power source 118 can pass through the cable 112 when the switch 116 is actuated by the controller 102.

The tension cable 112 is made from shape memory alloy that changes shape according to an amount of current applied to the cable. For example, the tension cable 112 may contract by a predetermined number (n) millimeters per milliamp of current. Accordingly, a predetermined response is measurable and recordable in a computer memory such that an individual setting (a magnitude of current) for achieving a desired amount of deformation of the support basket 103 is possible. For example, the controller 102 is configured to receive an actuation signal from the actuation switch 101. The controller 102 then determines a user profile associated with the actuation signal by correlating a signal characteristic from the actuation switch to a saved user profile. The electric current has a predetermined magnitude corresponding to a tension length of the shape memory alloy tension cable 112. The controller 102 transmits the electric current based on the user profile associated with the user identification, which is associated with a magnitude of current to transmit through the tension cable 112 that produces a corresponding amount of deformation in the basket. By deforming the basket, the system 100 can support the lumbar portion of a user's back when the system is installed on an aircraft seat.

The tension cable 112 is in communication with the proximate end 104 and the distal end 106 of the support basket 103 in various ways, as depicted in the various embodiments of FIG. 2, FIG. 3, FIG. 4, and FIG. 5. Each embodied configuration is described in greater detail below. Starting first with FIG. 1, the tension cable 112 is attached to the support basket by two ends of the tension cable. A first end 110 of the tension cable and a second end 108 of the tension cable 112 are depicted in FIG. 1 as connected rigidly to the proximate end 104 and the distal end 106 in either a fixed fashion via first end of the tension cable 112, or a second end 108 of the tension cable 112, respectively.

Figure 2:
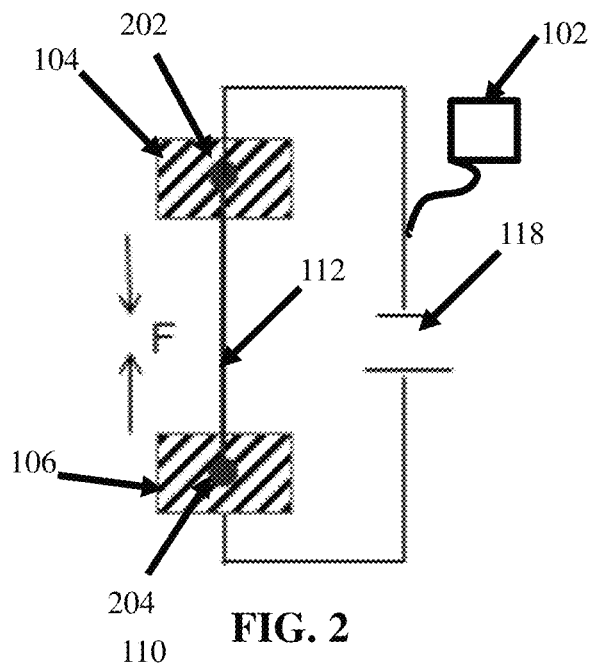
FIG. 2 is a configuration of a shape memory tension cable and deformable lumbar support basket for the lumbar support system of FIG. 1 according to an embodiment.
Figure 3:
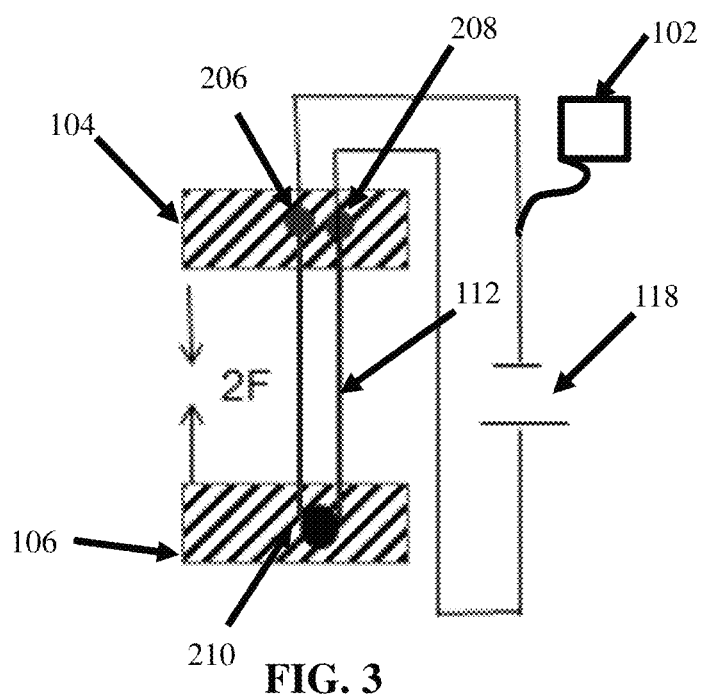
FIG. 3 is another configuration of a shape memory tension cable and deformable lumbar support basket for the lumbar support system of FIG. 1 according to an embodiment.
Figure 4:
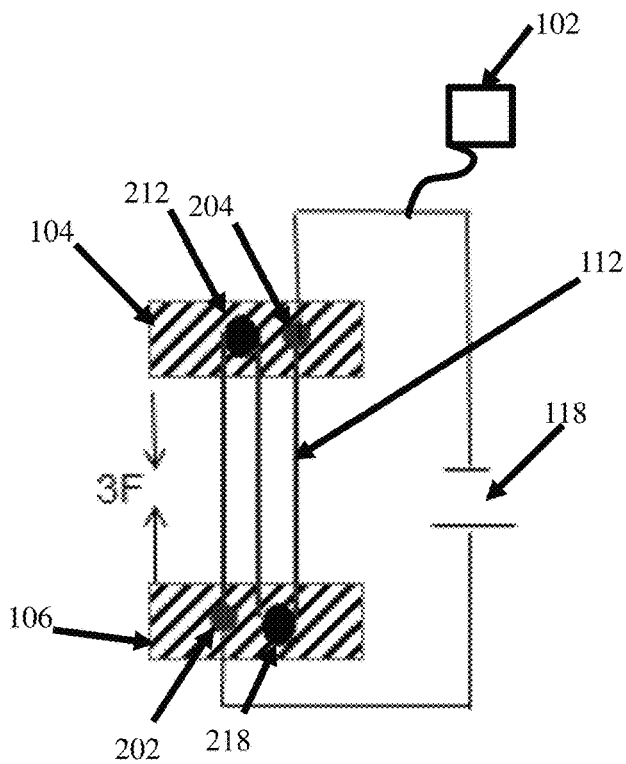
FIG. 4 is another configuration of a shape memory tension cable and deformable lumbar support basket for the lumbar support system of FIG. 1 according to an embodiment.
Figure 5:
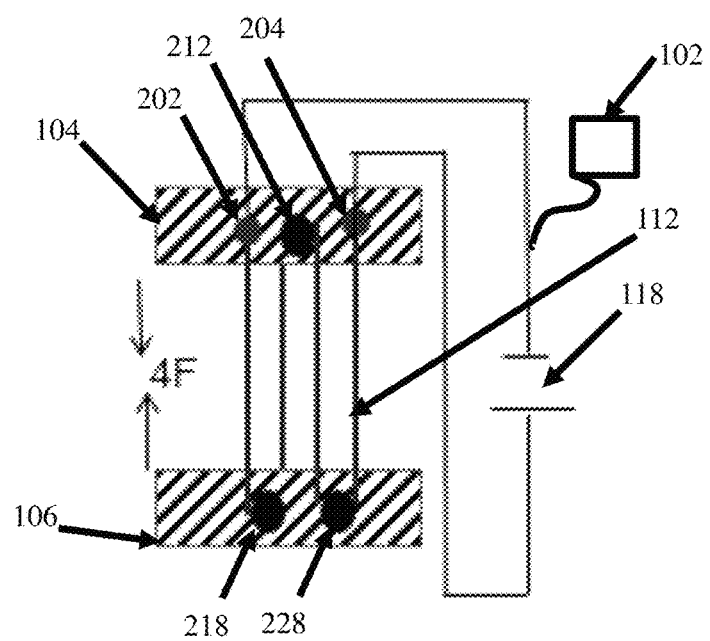
FIG. 5 is another configuration of a shape memory tension cable and deformable lumbar support basket for the lumbar support system of FIG. 1 according to an embodiment.

FIG. 2 is a simplified view of the configuration of the shape memory tension cable 112 for the lumbar support system of FIG. 1. FIG. 2 depicts a block diagram of the proximate end 104 and the distal end 106 of the support basket 103. The shape memory alloy tension cable 112 includes a first connecting end 202 and a second connecting end 204. The first and second connecting ends 202, 204, are rigidly connected with the proximal and distal ends of the support basket, where the end of the tension cable 112 can apply force to the support basket 103 directly because the cable 112 is securely fastened to the basket end. Accordingly, tension force is transmitted to the basket directly through the ends without any mechanical advantage of one or more pins (as shown in FIGS. 3-5). In FIG. 2, the first connecting end 202 rigidly connects to the proximate end 104 of the deformable lumbar support basket 103, and the second connecting end 204 rigidly connects to the distal end 106 of the deformable lumbar support basket 103. With the configuration of FIG. 2, when the controller 102 transmits the electric current from the power source 118 through the shape memory alloy tension cable 112, the transmission causes the tension cable 112 to deform the lumbar support basket 103 with tension force received at the proximate end 104 of the deformable lumbar support basket 103 via the first connecting end 202 of the tension cable 112 and with tension force received at the distal end 106 of the deformable lumbar support basket 103 via the second connecting end 204 of the tension cable 112.

FIG. 3 is another configuration of a shape memory tension cable 112 for the lumbar support system of FIG. 1, according to another embodiment. As shown in FIG. 3, the shape memory alloy tension cable 112 includes a first connecting end 206 and a second connecting end 208. The first and second connecting ends 206, 208 both rigidly connect to the proximate end 104 of the deformable lumbar support basket 103. The distal end 106 includes a pin 210 in communication with the shape memory alloy tension cable 112 such that the electric current transmitted by the controller 102 from the power source 118 through the shape memory alloy tension cable 112 causes the tension cable 112 to deform the lumbar support basket 103 with tension force received at the distal end 106 via the pin and received at the proximate end 104 via the first connecting end 206 and second connecting end 208 of the tension cable 112. As shown in FIG. 3, the mechanical advantage of the tension force applied to the proximate and distal ends 104, 106, of the lumbar basket 103 results in 2F (two times the force applied in the configuration of FIG. 2 at the same given current).

FIG. 4 is another configuration of a shape memory tension cable 112 for the lumbar support system 100 of FIG. 1 according to an embodiment. The configuration of FIG. 4 depicts a first connecting end 202 of the shape memory alloy tension cable 112 rigidly connecting to the distal end 106 of the deformable lumbar support basket 103. As shown in FIG. 4, a second connecting end 204 of the shape memory alloy tension cable 112 rigidly connects to the proximate end 104 of the deformable lumbar support basket 103. A first pin 212 rigidly connects to the proximate end 104 of the support basket 103, and is in communication with the shape memory alloy tension cable 112, where the shape memory alloy tension cable 112 loops around the first pin 212 to provide mechanical advantage to the force applied to the distal and proximate ends. As shown in FIG. 4, a second pin 218 rigidly connects to the distal end 106 and is in communication with the shape memory alloy tension cable 112 by providing mechanical advantage to the tension force applied. The electric current transmitted by the controller 102 from the power source 118 through the shape memory alloy tension cable 112 causes the shape memory alloy tension cable 112 to deform the lumbar support basket 103 with tension force received at the proximate end 104 via the first pin 212 and via the second connecting end 204 of the tension cable 112. The electric current also causes the deformation of the lumbar support basket 103 with tension force received at the distal end 106 via the first connecting end 202 of the shape memory alloy tension cable 112 and the second pin 218. As shown in FIG. 4, the force applied by the shape memory alloy tension cable 112 is three times (3F) the force applied in FIG. 2.

FIG. 5 is another configuration of a shape memory tension cable for the lumbar support system of FIG. 1, according to an embodiment. A first connecting end 202 of the shape memory alloy tension cable 112 rigidly connects to the proximate end 104 of the deformable lumbar support basket 103. A second connecting end 204 of the shape memory alloy tension cable 112 rigidly connects to the proximate end 104 of the deformable lumbar support basket 103. A first pin 212 rigidly connects to the proximate end 104 and is in communication with the shape memory alloy tension cable 112. The tension force is transmitted from the shape memory alloy tension cable 112 to the first pin 212 as the cable 112 wraps around the first pin 212 and applies force to the first pin 212 when the shape memory alloy tension cable 112 tenses. Similarly, a second pin 218 and a third pin 228 rigidly connect to the distal end 106 of the support basket 103, and is in communication with the shape memory alloy tension cable 112 as described above with respect to the first pin 212. The electric current transmitted by the controller 102 from the power source 118 through the shape memory alloy tension cable 112 causes the tension cable 112 to deform the lumbar support basket 103 with tension force received at the proximate end 104 via the first pin 212 and via the first connecting end 202 of the shape memory alloy tension cable 112, the second connecting end 204 of the tension cable 112 and the first pin 212, and with tension force received at the distal end 106 via the second pin 218 and the third pin 228.

Figure 6:
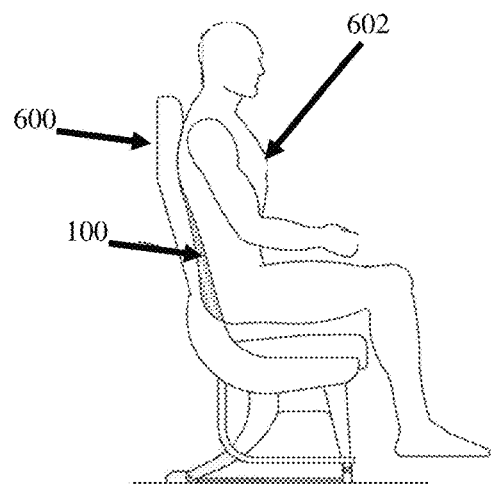
FIG. 6 is an aircraft seat configured with the lumbar support system of FIG. 1 according to an embodiment.

FIG. 6 is an aircraft seat configured with the lumbar support system of FIG. 1 according to an embodiment. As shown in FIG. 6, the lumbar support system 100 as shown in FIG. 1 supports the lumbar portion of a user's 602 back.

Figure 7:
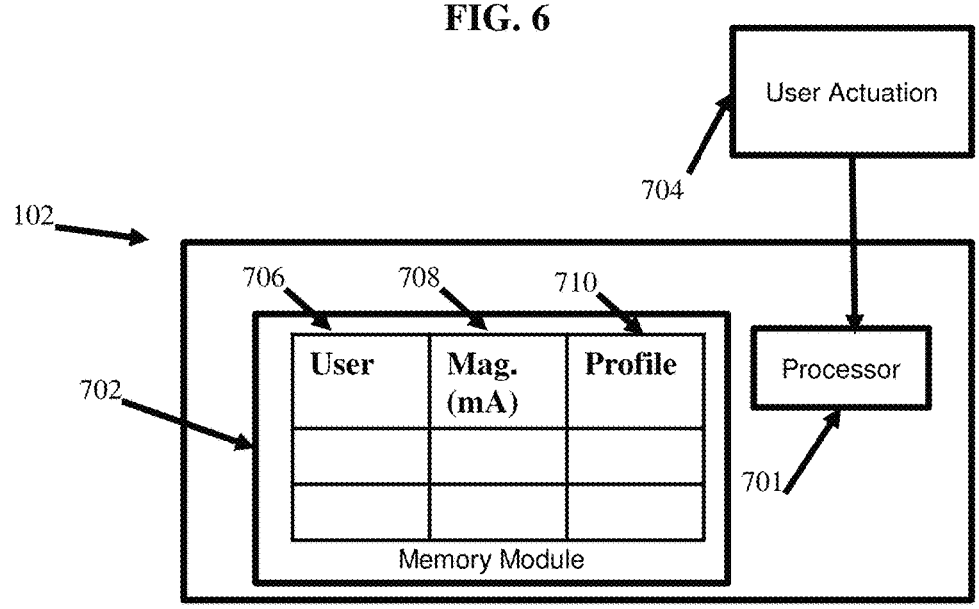
FIG. 7 is a controller for a lumbar support system according to an embodiment.

FIG. 7 is a controller for a lumbar support system according to an embodiment. As shown in FIG. 7, the controller 102 for the lumbar support system 100 includes a non-transitory computer-readable memory 702 storing program instructions that, when executed by a processor 701, cause the processor 701 to receive an actuation signal, and determine, via the actuation signal, a user profile 710 indicative of a magnitude of electric current 708 to deform a deformable lumbar support basket (e.g., lumbar support basket 103). As shown in FIG. 7, the memory 702 includes user profile information 710 that associates a magnitude setting 708 of the current to apply to the shape memory alloy tension cable 112. A record for each unique user 706 is saved on the memory 702. The processor 701 transmits, based on the user profile information 710, an electric current through a shape memory alloy tension cable 112 that has a changeable tension length with the electric current through the cable. As described with respect to FIGS. 1-6, the shape memory alloy tension cable 112 is in communication with a proximate end of the deformable lumbar support basket, and in communication with a distal end of the deformable lumbar support basket (which can vary according to the embodiments depicted with respect to FIGS. 2-5). The electric current transmitted through the shape memory alloy tension cable 112 causes the shape memory alloy tension cable 112 to deform the lumbar support basket 103 by tension force applied by the shape memory alloy tension cable 112 to the proximate end 104 of the deformable lumbar support basket 103 and the distal end 106 of the deformable lumbar support basket 103.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A lumbar support system for an aircraft seat comprising:
    a deformable lumbar support basket having a proximate end and a distal end;
    a shape memory alloy tension cable in communication with the proximate end of the deformable lumbar support basket, and the distal end of the deformable lumbar support basket, wherein the shape memory alloy tension cable has a changeable tension length with an electric current through the tension cable; and
    a controller operatively connected with the shape memory alloy tension cable configured to:
    transmit the electric current through the shape memory alloy tension cable;
    wherein the electric current transmitted through the shape memory alloy tension cable causes the shape memory alloy tension cable to deform the lumbar support basket by tension force applied to the proximate end of the deformable lumbar support basket and the distal end of the deformable lumbar support basket;
    wherein the controller transmits the electric current through the shape memory alloy tension cable by:
    receiving an actuation signal from an actuation switch;
    determining a user profile associated with the actuation signal; and
    transmitting the electric current based on the user profile, wherein the electric current has a predetermined magnitude corresponding to a tension length of the shape memory alloy tension cable.

2. A lumbar support system for an aircraft seat comprising:
    a deformable lumbar support basket having a proximate end and a distal end;
    a shape memory alloy tension cable in communication with the proximate end of the deformable lumbar support basket, and the distal end of the deformable lumbar support basket, wherein the shape memory alloy tension cable has a changeable tension length with an electric current through the tension cable; and
    a controller operatively connected with the shape memory alloy tension cable configured to:
    transmit the electric current through the shape memory alloy tension cable;
    wherein the electric current transmitted through the shape memory alloy tension cable causes the shape memory alloy tension cable to deform the lumbar support basket by tension force applied to the proximate end of the deformable lumbar support basket and the distal end of the deformable lumbar support basket;
    wherein the shape memory alloy tension cable comprises a first connecting end and a second connecting end, wherein the first and second connecting ends both connect to the proximate end of the deformable lumbar support basket;
    wherein the distal end comprises a pin in communication with the shape memory alloy tension cable such that the electric current transmitted through the shape memory alloy tension cable causes the shape memory alloy tension cable to deform the lumbar support basket with tension force received at the distal end via the pin and received at the proximate end via the first and second connecting ends of the tension cable.

3. An aircraft seat configured with a lumbar support system comprising the lumbar support system of claim 2.

4. A lumbar support system for an aircraft seat comprising:
- a deformable lumbar support basket having a proximate end and a distal end;
- a shape memory alloy tension cable in communication with the proximate end of the deformable lumbar support basket, and the distal end of the deformable lumbar support basket, wherein the shape memory alloy tension cable has a changeable tension length with an electric current through the tension cable; and
- a controller operatively connected with the shape memory alloy tension cable configured to:
  transmit the electric current through the shape memory alloy tension cable;
  wherein the electric current transmitted through the shape memory alloy tension cable causes the shape memory alloy tension cable to deform the lumbar support basket by tension force applied to the proximate end of the deformable lumbar support basket and the distal end of the deformable lumbar support basket;

wherein:
- a first connecting end of the shape memory alloy tension cable rigidly connects to the distal end of the deformable lumbar support basket;
- a second connecting end of the shape memory alloy tension cable rigidly connects to the proximate end of the deformable lumbar support basket;
- a first pin rigidly connects to the proximate end and is in communication with the shape memory alloy tension cable; and
- a second pin rigidly connects to the distal end and is in communication with the shape memory alloy tension cable;

wherein the electric current transmitted through the shape memory alloy tension cable causes the shape memory alloy tension cable to deform the lumbar support basket with tension force received at the proximate end via the first pin and via the second connecting end of the tension cable, and with tension force received at the distal end via the first connecting end of the shape memory alloy tension cable and the second pin.

5. An aircraft seat configured with a lumbar support system comprising the lumbar support system of claim 4.

6. The lumbar support system of claim 4 further comprising
- a third pin rigidly connects to the distal end and is in communication with the shape memory alloy tension cable.

7. The lumbar support system of claim 1, wherein the shape memory alloy tension cable is comprised of nickel titanium.

8. The lumbar support system of claim 1, wherein the electric current has a magnitude of at least 660 mA and less than or equal to 4000 mA.

9. An aircraft seat configured with a lumbar support system comprising the lumbar support system of claim 1.

10. A controller for a lumbar support system comprising a non-transitory computer-readable memory storing program instructions that, when executed by a processor, cause the processor to:
- receive an actuation signal;
- determine, via the actuation signal, a user profile indicative of a magnitude of electric current to deform a deformable lumbar support basket; and
- transmit, based on the user profile, an electric current through a shape memory alloy tension cable that has a changeable tension length with the electric current through the tension cable;
- wherein the shape memory alloy tension cable is in communication with a proximate end of the deformable lumbar support basket, and in communication with a distal end of the deformable lumbar support basket,
- wherein the electric current transmitted through the shape memory alloy tension cable causes the shape memory alloy tension cable to deform the lumbar support basket by tension force applied by the shape memory alloy tension cable to the proximate end of the deformable lumbar support basket and the distal end of the deformable lumbar support basket.

11. The controller of claim 10, wherein the shape memory alloy tension cable is comprised of nickel titanium.

12. The controller of claim 11, wherein the electric current has a magnitude of at least 660 mA and less than or equal to 4000 mA.

* * * * *